United States Patent Office 3,518,168
Patented June 30, 1970

3,518,168

ELECTROLYTIC PROCESS OF PREPARING A COPPER FOIL FOR A PLASTIC COAT

Thomas E. Byler, Warren, Pa., and Donald H. Osborn, Rome, N.Y., assignors to Revere Copper and Brass Incorporated, New York, N.Y., a corporation of Maryland No Drawing. Filed Nov. 18, 1966, Ser. No. 595,348
Int. Cl. C23b *1/00, 3/00, 5/50*
U.S. Cl. 204—32 1 Claim

ABSTRACT OF THE DISCLOSURE

Method of preparing a copper foil to increase the adhesion of a subsequent plastic coat by first electroetching in a specific mineral acid bath to attain a uniform roughened surface, secondly rinsing said surface and lastly electroplating dendritic copper deposits from a specific cyanide copper bath at a current density of about 50–130 amperes per square foot.

This invention relates to the surface treatment of sheet copper and, more particularly, to the treatment of such a surface preparatory to the production of printed electric circuits.

One of the presently favored methods of producing printed circuits comprises the acid etching of a metal foil-clad laminate. The laminate, consisting of a filler and a plastic binder, provides an insulating base material which can be clad with metal foil. The foil is generally bonded to the laminate base material, either with or without an intervening layer of plastic adhesive, and considerable effort has been directed to the development of adhesives which will provide adequate strength between the laminate and the foil. Copper is commonly preferred as the foil metal, and electrodeposited copper foil has been found heretofore to be more amenable to strong bonding to the laminate base material than the smoother-surfaced rolled sheet copper foil. However, rolled copper sheet has electrical, physical and chemical characteristics that make it highly desirable as the foil component of printed circuits if satisfactory strength of the bond between the foil and the laminate base can be achieved.

We have now discovered a method of imparting to a surface of rolled sheet copper the ability to be bonded tenaciously to a plastic material, whether the plastic material is the adhesive for a printed circuit or is a painted, protective or decorative coating for the copper, or any other similar plastic layer. The method of the invention comprises cleaning the surface of the copper sheet to be treated, making the cleaned copper sheet surface an anode in an electrolytic mineral acid-containing etching bath, passing electric current through the clean sheet surface with an anodic current density sufficient to effect electrolytic etching of said surface, withdrawing the surface-etched sheet from the etching bath, and removing all entrained acid from the withdrawn sheet. The clean etched surface of the sheet is then made a cathode in an electrolytic copper deposition bath, and current is passed to the clean etched surface of the sheet with a current density sufficient to produce a dendritic deposit of copper thereon.

The preliminary cleaning step in our method is a conventional operation common to any copper plating or electrodeposition process. The purpose of this step is merely to provide a greaseless oxide-free surface on the copper sheet, and any of the conventional copper cleaning baths may be used satisfactorily. For example, grease and oil may be effectively removed by passing the rolled copper sheet through a bath of an alkaline cleaner such as an alkali metal hydroxide, carbonate, phosphate, or the like, or through an organic solvent such as trichlorethylene, or by electrolytic degreasing in an alkaline bath. Of course, if the copper sheet to be treated pursuant to the invention is obtained in a form sufficiently clean to be fed directly to the electrodeposition step, then the preliminary washing step is unnecessary and is eliminated.

The etching of the clean surface of the rolled sheet copper is effected electrolytically in a mineral acid-containing bath, such, for example, as a hydrochloric, sulfuric or phosphoric acid-containing bath. The acid concentration of this bath should be between about 20% to about 40% by weight of HCl, $H_2SO_4$ or $H_3PO_4$. A representative etching bath which we have found to be particularly advantageous is formed from one part of water and three parts by volume of 37% hydrochloric acid. The temperature of the bath tends to be raised by the electrolytic action, and we have found it advisable to artifically cool the bath so that its temperature does not rise above about 90° F. The cathode for the electroetch can be any non-cupreous material such as lead or graphite. The cell voltage and the copper sheet anode current density are advantageously those conventionally used for anodic electroetching such, for example, as about 1 volt and about 40 to 80 amperes per square foot of anode surface, respectively. Electroetching is carried out for a sufficient period of time to effect the desired surface etching of the copper sheet, and generally this result is achieved in about 3 minutes under the aforementioned conditions.

Following the electroetching step, the acid must be removed from the etched copper surface before subjecting it to the copper electrodeposition step. Removal of the acid can be effectively achieved merely by thorough rinsing although we presently prefer to rinse the sheet in cold water, then rinse it in a neutralizing solution such as a 5% by weight sodium hydroxide solution, and follow this with another cold water rinse. Regardless of the specific rinsing schedule, it should be sufficient, particularly in a continuous operation, so as not to contaminate the copper deposition bath with an objectionable amount of acid.

The etched surface of the rolled copper sheet will be characterized at this stage by pits which leave upstanding promontories adjacent the pits. The promontories have strong full bases and are not significantly undercut. As a result, they are ideal for the further build-up of electrodeposited copper thereon without creating a condition where the minute dendrites are so fragile that they break and form a copper dust which impairs the production and quality of the ultimate foil-plastic laminate.

The copper electrodeposition pursuant to the invention is effected by making the clean etched surface the cathode in an electrolytic copper deposition cell, that is, the sheet is positioned in the cell with its etched surface facing the cell anode. The composition of the cell bath is important because we have found that only a cuprous cyanide bath gives proper results. The bath may contain a relatively small amount of free cyanide such as sodium cyanide, but this free cyanide content should not exceed about 5% of the cuprous cyanide content of the bath. The temperature of the bath tends to rise during electrolysis and must be controlled, by appropriate conventional cooling technique, so as to remain within the range of about 60° to 100° F. It is unnecessary and generally undesirable to include in the bath the usual addition agents (such as animal glue or the like) which are commonly added to prevent the growth of dendrites. The deposited copper can be derived from the bath but in order to simplify control of the cuprous cyanide content of the bath it is presently preferred to use a consumable copper anode.

The current density used for the copper deposition is within a range which will produce a rough or dendritic deposit. Thus, copper sheet cathode current densities within the range of about 50 to about 130 amperes per square foot at about 10 to 11 volts are useful, and operation is continued under these conditions for a period of time such, for example, as about 3 minutes, sufficient to build up the desired deposit of copper on the surface of the rolled sheet. Under these conditions, the copper tends to deposit predominantly on the promontories and to a lesser extent in the pits of the etched starting surface. Consequently, the electrodeposition of copper on the etched surface builds relatively large strongly-based promontories which are ideal for bonding to a plastic base or coating. When two ounces per square foot rolled copper foil is treated by this method, peel strengths between the foil and bonded plastic ranges between 13 to 16 pounds per inch of width, and when the method is applied to 1 ounce per square foot rolled copper foil the peel strength ranges between about 9 and 10 pounds per inch of width. These peel strengths obviously exceed the 8.0 pounds per inch of width called for by present industry standards.

The method of the invention is particularly amenable to continuous operation so that an entire roll of rolled copper sheet can be treated without interruption or discontinuity in its bonding surface characteristics. Thus, as the roll is unwound, the sheet is advantageously passed serially through a cleaning bath, a rinse zone, the electroetching bath, a second rinse zone, the electrodeposition bath, a third rinse zone and a final drying zone. The etching operation is advantageously provided with circulating filtration or a conventional cathode diaphragm to prevent copper sludge from attaching itself to the sheet conveyor rolls or to the sheet itself. The difference in polarity of the copper sheet in the electroetching and electrodeposition steps can be maintained readily by collectors appropriately placed along the production line. The bath temperatures in both the electroetch and electrodeposition stages can readily be maintained by conventional means such as heat exchangers.

The following specific example is illustrative of the practice of the invention:

Rolled copper sheet weighing 2 ounces per square foot was degreased by immersion for about 3 minutes in an aqueous alkaline bath containing 8 ounces per gallon of a conventional alkaline degreasing agent and maintained at about 180° F. After rinsing the degreased sheet with cold water, the sheet was immersed in an electroetching bath consisting essentially of an aqueous solution of hydrochloric acid containing 75% by volume of 37% hydrochloric acid and maintained at a temperature of about 80° F. The sheet was made anodic with respect to a graphite cathode and etching was effected by applying a voltage of about 1 volt so as to develop an anode current density of about 60 amperes per square foot for about 3 minutes. The etched sheet was then rinsed with cold water, then with a 5% by weight aqueous solution of sodium hydroxide, followed by another rinse with cold water.

The resulting etched sheet, substantially free of hydrochloric acid, was then immersed in a copper electrodeposition bath composed essentially of an aqueous solution containing about 100 grams per liter of CuCN and 3 grams per liter of free NaCN maintained at a temperature of about 80° F. The sheet was made the cathode with respect to an anode composed of copper with 10% steel to minify anode polarization. At a cell voltage of 10–11 volts, a current density of about 120 amperes per square foot was obtained and electrodeposition of copper from the bath onto the etched sheet surface was continued for about 3 minutes. The resulting sheet was rinsed with cold water, then with hot water containing about 2 grams per liter of benzotriazole at about 150° F. to prevent surface oxidation, and was subsequently dried.

The final sheet product was then bonded to a representative base material for printed electronic circuits. This material consisted of glass cloth impregnated with an epoxy resin. Bonding between this and the copper sheet was carried out according to representative manufacturers' recommendations by the use of a temperature of 325–350° F. and a pressure of 900–1000 p.s.i. After bonding and cooling, several one inch wide strips were cut, the end of the resinous bonding material of each sample was pried up and pulled free until the parting line extended across the width perpendicular to the long edge of the strip. The bonding material was then pulled away in a direction perpendicular to the sheet. The tension on the coating required to pull the remaining adhering portion away from the strip was measured and ranged between 13 and 16 pounds per inch of width for the several samples. These values exceeded that of 8 pounds per inch of width which has been set as the desirable value by manufacturers of printed circuits. The laminated product also passed the standard solder dip test as well as the United States Avionics Specification and etching tests for all of the commonly used etchants. The product was free of dust and did not transfer any copper particles to the board during lamination or peel testing.

We claim:

1. The method of imparting to the smooth surface of rolled sheet copper the ability to be bonded tenaciously to a plastic material which comprises:

(a) making a clean rolled copper sheet surface an anode in an electrolytic etching bath containing about 20 to 40% by weight of hydrochloric acid maintained at a temperature within the range of about 60–100° F., (b) passing electric current through the clean anode sheet surface with a current density of about 40–80 amperes per square foot to effect electrolytic etching of said surface, characterized by promontories with full bases free from undercutting, (c) withdrawing the surface-etched sheet from the etching bath, (d) removing all entrained acid from the withdrawn sheet, (e) making the clean etched surface of the sheet a cathode in a cuprous cyanide electrolytic copper deposition bath containing about 100 grams of cuprous cyanide and up to about 5 grams of free cyanide per liter and maintained at a temperature of about 60–100° F., and (f) passing electric current to the clean etched surface of the sheet with a current density of about 50–130 amperes per square foot for a period of time sufficient to build up a deposit of copper predominantly on the aforesaid promontories and thus produce on the surface of the rolled sheet copper a multiplicity of promontories sufficiently strong as to resist transfer to the plastic material when the latter is torn from the copper sheet in destructive testing.

References Cited

UNITED STATES PATENTS

| | | | |
|---|---|---|---|
| 3,198,672 | 8/1965 | De Hart | 148—6.14 |
| 3,293,109 | 12/1966 | Luce et al. | 161—166 |
| 3,322,656 | 5/1967 | Dahringer | 204—38 |
| 3,328,275 | 6/1967 | Waterbury | 204—38 |

JOHN H. MACK, Primary Examiner

W. B. VAN SISE, Assistant Examiner

U.S. Cl. X.R.

204—38